(No Model.)
J. F. KELLER.
FEED ROLLER FOR GRASS SOWERS.
No. 293,968. Patented Feb. 19, 1884.
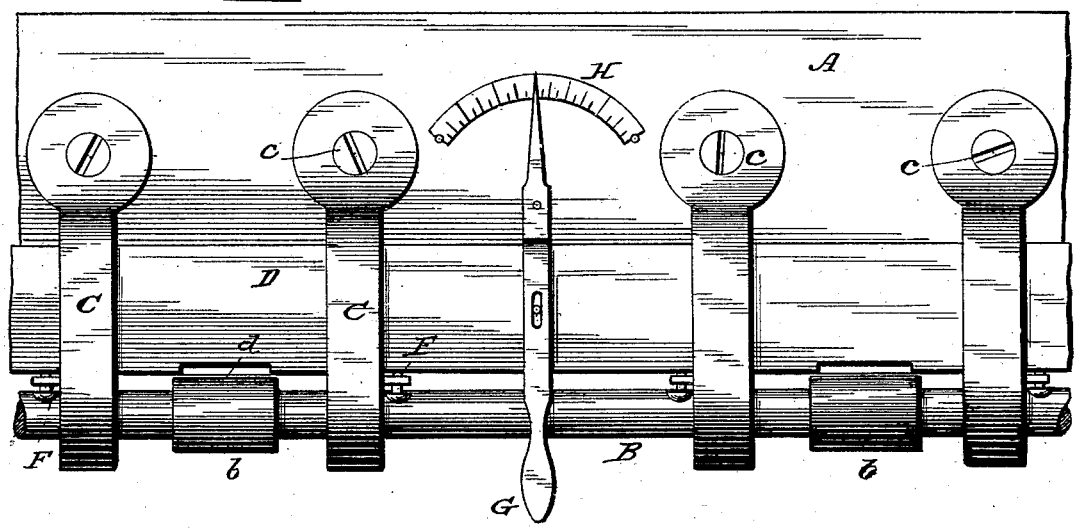
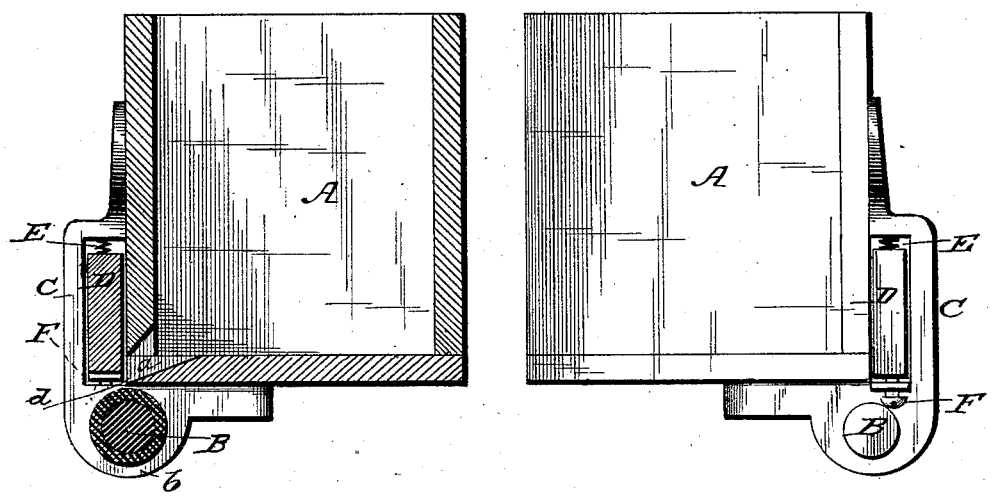
WITNESSES:
Fred. G. Dieterich.
A. E. Dieterich
INVENTOR.
John F. Keller
By Daniel Breed ATTORNEY.

UNITED STATES PATENT OFFICE.

JOHN F. KELLER, OF MARTINSBURG, WEST VIRGINIA.

FEED-ROLLER FOR GRASS-SOWERS.

SPECIFICATION forming part of Letters Patent No. 293,968, dated February 19, 1884.

Application filed September 11, 1883. (No model.)

*To all whom it may concern:*

Be it known that I, JOHN F. KELLER, of Martinsburg, in the county of Berkeley and State of West Virginia, have invented a new and useful Improvement in Feed-Rollers for Grass-Seed Sowers, of which the following is a specification.

My invention consists of a novel construction of overshot feed-roller, which will be understood by the following description and claims.

In the accompanying drawings, Figure 1 is a rear view of a portion of my grass-seed hopper, with my improved feed-roller attached thereto. Fig. 2 is a section thereof. Fig. 3 is an end view.

In the bottom of the hopper A is the discharge-opening $a$, with the feed-roller B directly under said discharge, the roller being so close to the opening as to allow only one layer of seed to pass out, and also to prevent the flow of seed when the roller is at rest. The roller or shaft may be moved by band and pulley or other suitable means. The roller consists of a shaft, B, surfaced with a tubular piece of rubber, $b$, slipped thereon at each feed-opening of the grass-seed hopper. This roller is journaled in a series of staples, C, fastened to the hopper by means of wood-screws $c$, one in the rear of the box, and one in the bottom thereof. An adjustable slide, D, is held in place by these staples C, and provided with springs E, to press the slide downward toward the roller B, and also having set-screws F, for raising or lowering said roller at pleasure, in order to increase or diminish the flow of seed. This slide has a series of notches, $d$, through which the seed flows, and by adjusting the slide endwise this notch gives a greater or less flow of seed at pleasure. An arm, G, serves to move the slide D to the right or left, at pleasure, and a scale, H, with an index on the upper end of arm G, indicates the quantity or rate of seed being sowed.

By the above construction of feed-roller there is no rubbing of the roller or seed, and consequently the rubber is not worn as in machines where the roller has a scraping action in delivering the seed. The space between the roller and the slide should be just large enough to allow one layer of seed to pass through. If extra large seed are to pass, the the rubber will yield a little and let these larger seeds through without wear and tear of the roller or injury to the seed. The edge of the discharge-opening is beveled so as to come to a sharp edge at the top of the roller, and thus feed down a thin layer of seed to be fed out by the rubber roller.

I do not broadly claim a rubber-surfaced roller or shaft or an undershot-roller by means of which the seed is scraped out; but my roller may be revolved in the opposite direction and discharge the seed over the front of the roller.

Having described my invention, what I claim, and desire to secure by Letters Patent of the United States, is—

1. The described overshot feed-roller, working directly under the seed-discharge opening of the hopper, whereby a single layer of seed is delivered from the hopper without any sliding or rubbing friction and wear upon said roller or upon the seed, substantially as set forth.

2. In combination with the overshot feed-roller, the adjustable slide having notches on the under side to regulate the amount of seed discharged at each feed-opening, substantially as and for the purposes specified.

JOHN F. KELLER.

Witnesses:
 DANIEL BREED,
 EMMA M. GILLETT.